PULSE COUNTER TYPE FREQUENCY DETECTOR

Filed April 13, 1959

INVENTOR.
GERALD B. HERZOG
BY
Charles H. Brown
ATTORNEY

United States Patent Office 3,048,789

Patented Aug. 7, 1962

3,048,789

PULSE COUNTER TYPE FREQUENCY DETECTOR

Gerald B. Herzog, Princeton, N.J., assignor to Radio Corporation of America, a corporation of Delaware Filed Apr. 13, 1959, Ser. No. 805,938

8 Claims. (Cl. 329—107)

This invention relates to pulse counter type frequency detectors designed to translate pulse frequency information into direct current (D.C.) voltage, and particularly to a pulse counter type frequency detector including a feedback arrangement such that the detector is capable of producing an output D.C. voltage which is linear with pulse frequency (repetition rate) even when the output voltage level exceeds the input pulse amplitude.

An object of the invention is to provide an improved pulse counter type frequency detector.

A further object is to provide an improved pulse counter type frequency detector including a feedback arrangement for producing in a simple manner an output voltage linear with frequency over a wider range of output voltage levels relative to a given input pulse amplitude than has been possible heretofore using known arrangements.

Figure 1:
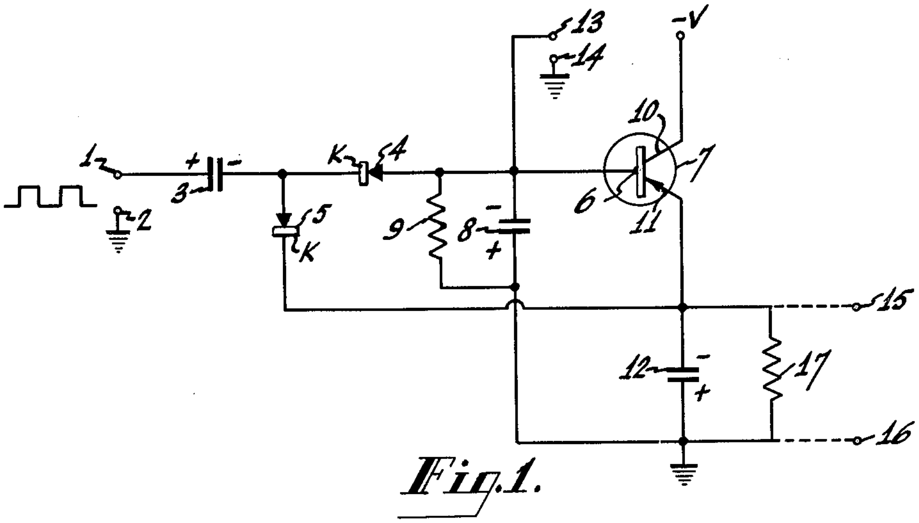
Figure 2:
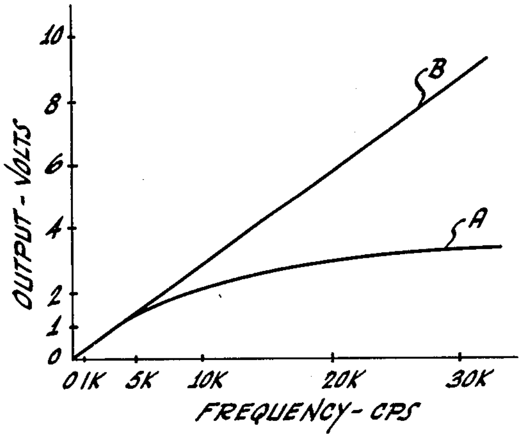

A detailed description of the invention will be given in connection with the accompanying drawing in which:

FIGURE 1 is a circuit diagram of one embodiment of a pulse counter type frequency detector arranged according to the invention; and FIGURE 2 is a pair of curves useful in describing the operation of the circuit diagram given in FIGURE 1.

Pulse counter circuits are known in which a capacitor is charged through a unidirectional current conducting device by the positive pulses in an input pulse train, the capacitor being charged to a level for each pulse determined by the input pulse amplitude. The capacitor discharges during the negative portions of the input pulse train into a much larger capacitor through a second unidirectional current conducting device. The larger capacitor is arranged to discharge through a resistor during the intervals in which the first or smaller capacitor is being charged by the positive pulses so that the average charge on the larger capacitor indicates the rate or frequency of the input pulses. An output voltage taken across the larger capacitor is linear with the frequency of the input pulses provided that the output voltage is always very small compared to the input pulse amplitude. In this condition, the same amount of charge is transferred from the smaller capacitor to the larger capacitor for each input pulse.

The charge transferred to the larger capacitor is a function of the difference between the potentials on the smaller and larger capacitors. As the potential on the larger capacitor becomes an appreciable fraction of the input pulse amplitude (or the level to which the smaller capacitor is charged) due to increasing input pulse frequency, the actual charge per pulse transferred to the larger capacitor is correspondingly reduced. Under these conditions, the charge on the larger capacitor increases non-linearly with frequency. This action is shown in the curve A of FIGURE 2, where capacitor or output voltage is plotted against frequency. A 6 volt peak-to-peak input pulse amplitude is assumed. During the periods in which a relatively small charge appears on the output or larger capacitor, the output voltage changes linearly with frequency. As the capacitor or output voltage approaches an appreciable fraction of the input pulse amplitude with high pulse frequencies, the voltage changes non-linearly with frequency. To satisfy the condition of linearity then, the output voltage must be kept small relative to the input pulse amplitude.

There are many applications such as in telemetering and in FM stereo multiplex operation where it is essential that the output voltage of a pulse frequency detector be linear over a desired range of pulse frequencies. This has required in using a detector of the type described above that the input pulse amplitude be made very large to obtain a reasonable output, or that the output be amplified. The high level input required creates circuit problems, particularly where transistors are used as in telemetering equipment. The use of a low input impedance transistor amplifier to amplify the output voltage changes the time constant of the circuit including the larger output capacitor and its associated resistor. Further, the output is subject to the drifts of the amplifier due to temperature changes. It is desirable that a pulse counter type frequency detector be provided avoiding the above disadvantages. Accordingly, applicant has provided a pulse counter type frequency detector by which an output voltage linear with frequency is produced, even when the output voltage level approaches or exceeds the input pulse amplitude.

In the circuit diagram shown in FIGURE 1, a pulse train including frequency information which is to be translated into a D.C. voltage is applied between a first input terminal 1 and a second input terminal 2 connected to a point of reference potential such as ground. The amplitude of the pulse train is constant. The circuit may be designed to handle a band of frequencies within a frequency range extending from audio up into the megacycle frequencies. The pulse train is applied via terminal 1 to one side of a capacitor or storage device 3. The other side of capacitor 3 is connected to the cathode K of a unidirectional current conducting device shown as a crystal diode 4 and to the anode of a second unidirectional current conducting device shown as a crystal diode 5. The arrow of the diodes 4, 5 indicates the direction of current flow.

The anode of diode 4 is connected to the base electrode 6 of a P-N-P junction transistor 7 of N type conductivity. The base electrode 6 of transistor 7 is also connected to a point of reference potential through a capacitor or storage device 8. The capacitor 8 is much larger than the capacitor 3 and may be, for example, ten times as large. A resistor 9 is connected across the capacitor 8. Capacitor 8 and resistor 9 constitute a circuit having a time constant which can be determined according to the expected range of pulse train frequencies. For lower frequencies, the values of capacitor 8 and resistor 9 can be determined to produce a relatively long time constant. For higher frequencies, the values can be determined to provide a shorter time constant, and so on. In any case, the time constant should be greater than the maximum expected interval between input pulses.

The collector electrode 10 of the transistor 7 is connected to a source of negative unidirectional potential. The emitter electrode 11 of transistor 7 is connected to a point of reference potential such as ground through a capacitor or storage device 12. A resistor 17 is connected across the capacitor 12. Capacitor 12 is generally larger than capacitor 8 and may be, for example, ten times as large. The junction of capacitor 12 and the emitter electrode 11 is connected to the cathode of diode 5 to provide a low impedance feedback path to the input of the detector. Output terminals 13, 14 are connected across the capacitor 8 to supply the detector D.C. output signal to a desired utilization circuit. In an alternative arrangement, the output may be taken via a pair of output terminals 15, 16 connected across the resistor 17, as shown in dotted lines.

In the operation of the arrangement shown in FIGURE 1, diode 5 is biased to conduct on the application of each positive pulse in the input pulse train to the terminal 1. Capacitor 3 charges over a path including terminal 1, diode 5 and capacitor 12 in the polarity shown. As will be described, capacitor 12 is charged to substantially the same potential as the capacitor 8. Capacitor 3 is charged on each positive pulse to a level equalling the sum of the positive pulse amplitude and the level of the charge on the capacitor 8. During the negative portions of the input pulse train, diode 5 is cut-off and diode 4 is biased to conduct. Capacitor 3 discharges through diode 4 into capacitor 8, and capacitor 8 is charged in the polarity shown. Since the level of the charging pulses applied to capacitor 8 is a function of the difference between the charges on capacitors 3 and 8, the charging pulses are always of constant level determined by the input pulse amplitude. During the periods in which capacitor 3 is charging on the positive pulses, diode 4 is cut-off, and a portion of the charge on capacitor 8 leaks off through resistor 9. The charge on the capacitor 8 is returned by the charging pulses supplied via capacitor 3 to the same level or a different level according to a change in the input pulse frequency and therefore the frequency of the charging pulses.

The charge on the capacitor 8 biases the base electrode 6 of transistor 7 negative with respect to the emitter electrode 11. The emitter electrode 11 is biased in the forward direction with respect to the base electrode 6, and transistor 7 conducts. Transistor 7 conducts at a level determined according to the charge on capacitor 8. As a result, capacitor 12 connected in the current conduction path of the transistor 7 is charged in the polarity shown to the same potential (less a very small base-emitter voltage) as capacitor 8. Any change in the charge on capacitor 8 results in a corresponding change in the charge on capacitor 12 by the current conduction of the transistor 7.

By returning the diode 5 over a low impedance path to a point at the same potential as on capacitor 8, a reference is established such that the capacitor 3 is always charged an amount greater than the potential on capacitor 8 by the input pulse amplitude. The pulse amplitude applied to capacitor 3 is always a fixed amount greater than the voltage level or potential on capacitor 8. The charge deposited on capacitor 8 by each charging pulse is independent of the potential on capacitor 8. Since the charging pulses applied to capacitor 8 vary only in frequency and do not vary in amplitude, the average charge on capacitor 8 varies only as a function of pulse frequency.

The average potential on capacitor 8 is linear with the frequency of the input pulse train even when an increasing pulse frequency causes the average potential to exceed the input pulse amplitude. Assuming an input pulse amplitude of 6 volts peak-to-peak, an output voltage as shown in the curve B of FIGURE 2 is produced. Instead of being first linear and then non-linear with frequency as in the case of curve A, the D.C. output voltage taken across the capacitor 8 remains linear with frequency over the operating range of the detector, the output saturating only when the collector electrode voltage supply is exceeded. The D.C. output voltage may be taken across the capacitor 8 via terminals 13, 14. Where a lower impedance output is desired, the output may be taken across capacitor 12 and resistor 17 via terminals 15 and 16.

The arrangement of the invention eliminates the need for applying a relatively high input pulse amplitude to a pulse counter type frequency detector in order to get a reasonable, linear output, since the output will be linear over the operating range of the detector and the level of the output can be determined by providing the appropriate collector electrode voltage supply. The problems encountered in using transistor amplifiers are also eliminated. By using an emitter follower, a negligible drift problem results since the drift is not amplified in the detector output as would be the case using a transistor amplifier.

Instead of a P-N-P junction transistor, an N-P-N junction transistor of P-type conductivity may be used for transistor 7 by merely altering the polarity of the bias voltages applied to the electrodes of transistor 7 in a manner understood in the art and reversing the diodes.

A circuit which has been constructed according to the invention was operated over a zero to 30 kc. p.s. frequency band and included components of the following values.

| | | |
|---|---|---|
| Capacitor 3 | mfd | .01 |
| Capacitor 8 | mfd | 2 |
| Capacitor 12 | mfd | 50 |
| Resistor 9 | ohms | 5600 |
| Resistor 17 | do | 5600 |

What is claimed is:

1. A pulse counter type frequency detector, comprising, a capacitor to one side of which is applied a pulse train, first and second diodes each having a cathode and an anode, means to connect the other side of said capacitor to the anode of said first diode and to the cathode of said second diode, a transistor having first, second and third electrodes, means to connect the anode of said second diode to said first electrode, a second capacitor larger than said first capacitor connected between said first electrode and a point of reference potential, a resistor connected across said second capacitor and of a value to permit said second capacitor to discharge therethrough, means to connect said second electrode to a source of unidirectional potential, a third capacitor, means to connect said third electrode through said third capacitor to said point of reference potential, means to connect the cathode of said first diode to the junction of said third electrode and said third capacitor, and means connected across said second capacitor for deriving a direct current output voltage from said second capacitor which is linear with the frequency of said pulse train even when said output voltage exceeds the amplitude of said pulses.

2. In combination, input means adapted to receive a constant amplitude pulse train having frequency intelligence to be translated into direct current voltage, a capacitor having one side connected to said input means, first and second crystal diodes each having an anode and a cathode, means to connect the other side of said capacitor to the anode of said first diode and to the cathode of said second diode, a transistor having base, emitter and collector electrodes, means to connect the anode of said second diode to said base electrode, a second capacitor larger than said first capacitor connected between said base electrode and a point of reference potential, a resistor connected across said second capacitor and of a value to permit said second capacitor to discharge therethrough, means to connect said collector electrode to a source of unidirectional potential, a third capacitor, means to connect said emitter electrode through said third capacitor to said point of reference potential, and means to connect the cathode of said first diode to the junction of said emitter electrode and said third capacitor, whereby a direct current output voltage is produced across said second capacitor linear with the frequency of said pulse train even when the output voltage exceeds the amplitude of said pulses.

3. A pulse counter type frequency detector, comprising, a capacitor to one side of which is applied an input pulse train, first and second diodes each having an anode and a cathode, means to connect the other side of said capacitor to the anode of said first diode and to the cathode of said second diode, a transistor having base, emitter and collector electrodes, means to connect the anode of said second diode to said base electrode, a second capacitor larger than said first capacitor connected between said base electrode and a point of reference potential, a resistor connected across said second capacitor and of a value to permit the discharging of said second capacitor therethrough, means to connect said collector electrode to a source of negative unidirectional potential, a third capacitor, means to connect said emitter electrode through said third capacitor to said point of reference potential, means to connect the cathode of said first diode to the junction of said emitter electrode and said third capacitor, and a pair of output terminals connected across said second capacitor, whereby a direct current voltage appears at said output terminals linear with the frequency of said pulse train even when the voltage exceeds the amplitude of said pulses.

4. A pulse counter type frequency detector, comprising, a capacitor to one side of which is applied an input pulse train, first and second diodes each having an anode and a cathode, means to connect the other side of said capacitor to the anode of said first diode and to the cathode of said second diode, a transistor having base, emitter and collector electrodes, means to connect the anode of said second diode to said base electrode, a second capacitor larger than said first capacitor connected between said base electrode and a point of reference potential, a resistor connected across said second capacitor and of a value to permit the discharging of said second capacitor therethrough, means to connect said collector electrode to a source of negative unidirectional potential, a third capacitor larger than said second capacitor, means to connect said emitter electrode through said third capacitor to said point of reference potential, means to connect the cathode of said first diode to the junction of said emitter electrode and said third capacitor, a second resistor connected across said third capacitor, and a pair of output terminals connected across said second resistor, whereby a direct current voltage appears at said output terminals linear with the frequency of said pulse train even when the voltage exceeds the amplitude of said pulses.

5. A pulse counter type frequency detector comprising, a capacitor, means for applying an input pulse train of constant amplitude to one side of said capacitor, first and second unidirectional current conducting devices, a transistor having base, emitter and collector electrodes, means to connect the other side of said capacitor through said first device to said base electrode and through said second device directly to said emitter electrode, said devices being poled for current conducting in opposite directions, a second capacitor larger than said first capacitor connected between said base electrode and a point of reference potential, a resistor connected across said second capacitor and of a value to permit the discharging of said capacitor therethrough, means to connect said collector electrode to a source of unidirectional potential, a third capacitor larger than said second capacitor, means to connect one side of said third capacitor to said point of reference potential and to connect the other side of said third capacitor to the junction of said second device and said emitter electrode, and a resistor connected across said third capacitor between said junction and said point of reference potential.

6. In combination, a capacitor, means to apply a constant amplitude pulse train to one side of said capacitor, first and second crystal diodes, a transistor having base, emitter and collector electrodes, means to connect the other side of said capacitor through said first diode to said base electrode and through said second diode directly to said emitter electrode, said diodes being poled for current conducting in opposite directions, a second capacitor larger than said first capacitor connected between said base electrode and a point of reference potential, a resistor connected across said second capacitor and of a value to permit the discharging of said second capacitor therethrough, means to connect said collector electrode to a source of unidirectional potential, a third capacitor larger than said second capacitor, means to connect one side of said third capacitor to said point of reference potential and to connect the other side of said third capacitor to the junction of said second diode and said emitter electrode, a resistor connected across said third capacitor between said junction and said point of reference potential, and means connected across said second capacitor for deriving a direct current output voltage linear with the frequency of said pulse train.

7. A pulse counter type frequency detector comprising, a capacitor to one side of which an input pulse train of constant amplitude is adapted to be applied, first and second diodes, a second capacitor larger than said first capacitor, a third capacitor, means to connect said first diode and said second capacitor in series between the other side of said first capacitor and a point of reference potential, means to connect said second diode and said third capacitor in series between said other side of said first capacitor and said point of reference potential, said first and second diodes being poled for current conduction in opposite directions, a first resistor connected across said second capacitor and of a value to permit the discharging of said second capacitor therethrough, a second resistor connected across said third capacitor, and means coupled between the junction of said second capacitor and said first diode and the junction of said third capacitor and said second diode arranged to conduct current over a path including said third capacitor at a level determined according to the charge on said second capacitor.

8. A pulse counter type frequency detector comprising, a capacitor to one side of which an input pulse train of constant amplitude is adapted to be applied, first and second diodes each having a cathode and an anode, means to connect the other side of said capacitor to the cathode of said first diode and to the anode of said second diode, a second capacitor larger than said first capacitor connected between the anode of said first diode and a point of reference potential, a resistor connected across said second capacitor and of a value to permit the discharging of said second capacitor therethrough, a third capacitor larger than said second capacitor connected between the cathode of said second diode and said point of reference potential, a second resistor connected across said third capacitor, and means coupled to the anode of said first diode and to the cathode of said second diode arranged to conduct current over a path including said third capacitor at a level determined according to the charge on said second capacitor.

References Cited in the file of this patent

FOREIGN PATENTS

| | | |
|---|---|---|
| 64,067 | France | Oct. 20, 1955 |
| 959,561 | France | Oct. 20, 1955 |